(12) United States Patent
Gort-Barten

(10) Patent No.: US 6,213,001 B1
(45) Date of Patent: Apr. 10, 2001

(54) KETTLE AND FILTER ATTACHMENT FOR A KETTLE

(75) Inventor: Leslie Alexander Gort-Barten, London (GB)

(73) Assignee: Dualit Limited, London (GB)

( * ) Notice: Subject to any disclaimer, the term of this patent is extended or adjusted under 35 U.S.C. 154(b) by 0 days.

(21) Appl. No.: 09/305,728

(22) Filed: May 5, 1999

(30) Foreign Application Priority Data

May 7, 1998 (GB) ................................................ 9809678
Nov. 13, 1998 (GB) ................................................ 9824992

(51) Int. Cl.⁷ ...................................................... A47J 27/21
(52) U.S. Cl. ........................... 99/323.3; 99/323; 99/279; 99/275; 210/466; 210/467
(58) Field of Search ........................... 99/323, 322, 316, 99/317, 318, 319, 320, 321, 323.3; 210/466, 467

(56) References Cited

U.S. PATENT DOCUMENTS

| | | | |
|---|---|---|---|
| 523,720 | * | 7/1894 | Fischer .................................. 210/466 |
| 817,397 | * | 4/1906 | Skinner ................................. 210/466 |
| 1,078,459 | * | 11/1913 | Pitschman ............................ 210/466 |
| 1,327,532 | * | 1/1920 | Duvall .................................. 210/466 |
| 1,654,185 | * | 12/1927 | Mrozek ................................. 210/466 |

FOREIGN PATENT DOCUMENTS

| | | | |
|---|---|---|---|
| 500635 | * | 6/1930 | (DE) ......................................... 99/322 |
| 673706 | * | 1/1930 | (FR) ....................................... 210/466 |
| 269306 | | 4/1927 | (GB) . |
| 350761 | | 6/1931 | (GB) . |
| 2 274 792 | | 8/1994 | (GB) . |
| 2 308 055 | | 6/1997 | (GB) . |

* cited by examiner

Primary Examiner—Reginald L. Alexander
(74) Attorney, Agent, or Firm—Lahive & Cockfield, LLP

(57) ABSTRACT

The invention provides a kettle having a body and a spout with an entrance end and an exit end. A coarse filter is located across the entrance end and a separate fine filter is detachably attached to the exit end. The fine filter assembly forms a seal with the surface of the spout at the exit end and is a push fit or snap fit, preferably incorporating an elastic sealing member, on the exit end.

24 Claims, 3 Drawing Sheets

KETTLE AND FILTER ATTACHMENT FOR A KETTLE

FIELD OF INVENTION

This invention relates to a kettle and to a filter attachment for use with a kettle.

BACKGROUND OF THE INVENTION

It is well known that when water is boiled in a kettle, solid scale tends to form inside the kettle. It is known for a single filter to be located in the kettle spout to prevent at least the large bits of scale leaving the kettle and entering, for example, a drink being made with water which has been boiled in the kettle. Such filters can become quickly clogged and are often difficult to remove and clean.

GB Specification 2308055 describes a single filter element, screw fitted into the open end of a kettle.

SUMMARY OF THE INVENTION

GB Specification 2274792 describes a fine filter element and a coarse filter element mounted in contact with one another in the entrance end of a kettle spout.

In one aspect the present invention provides a kettle having a spout and having a relatively coarse filter located at the entrance end of its spout and a separate relatively fine filter located at the exit end of the spout for preventing relatively fine particles from leaving the spout. In one form the coarse filter is formed of sheet metal with holes having a diameter of ½ to 3 mm (0.2 to 7 mm$^2$ area) located in the kettle body across the entrance to the spout. The fine filter is preferably formed of plastics material mesh of 250 to 350 microns (preferably 290 microns) with 30 to 40% (preferably 36%) open area, which is detachably located as a sealing push or snap fit at the open (exit) end of the kettle spout.

With such an arrangement the coarse particles are stopped by the coarse filter and fall back into the kettle and do not clog the coarse filter. The fine filter traps the fine particles but is easily removed from the kettle for washing.

In another aspect the invention provides a filter attachment for a kettle, the attachment comprising a plastics material support, the support mounting a fine mesh filter, and mounting means which is a push or snap fit on or in the kettle spout exit end for mounting the support to form a seal with the kettle spout but so that the filter is easily detachable from the kettle for cleaning.

In one form the mounting means is a push-fit over the end of the spout and the support is a snap-fit within the end of the mounting means. However, the filter could be more permanently mounted in the mounting means with the mounting means easily detachable from the spout end. The support is preferably of plastics material and prevents the metal spout end from contacting articles which could be broken, such as fine china, when pouring from the kettle.

In another aspect the invention provides a filter attachment for a kettle comprising a fine filter in a mounting and a relatively coarse filter in a mounting, and connecting means for connecting the mountings so that the filter mountings are detachably locatable in sealing engagement with kettle portions at opposite ends of the kettle spout.

In a further aspect the invention provides a filter attachment for a kettle substantially as described herein with reference to any of the accompanying drawings.

Preferably the mounting means or the support includes an inwardly and forwardly angled front end tending to return water into the kettle spout to prevent drips, or an outwardly extending, tapered and undercut lip for the same purpose.

SUMMARY OF THE DRAWINGS

Three embodiments of kettle and filter attachments will now be described, by way of example only, with reference to the diagrammatic drawings, given by way of example only, of which.

DETAILED DESCRIPTION OF EMBODIMENTS OF THE INVENTION

Figure 1:
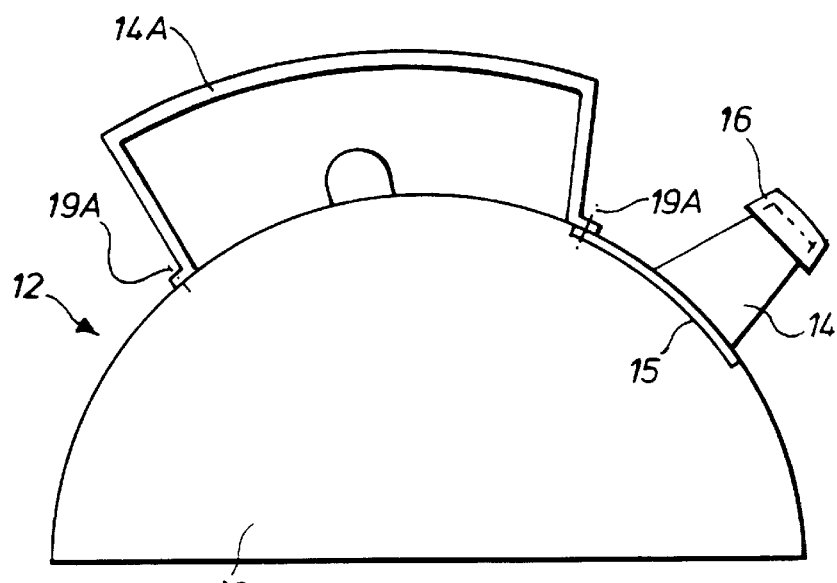
FIG. 1 shows a kettle with two separate filters.
Figure 2:
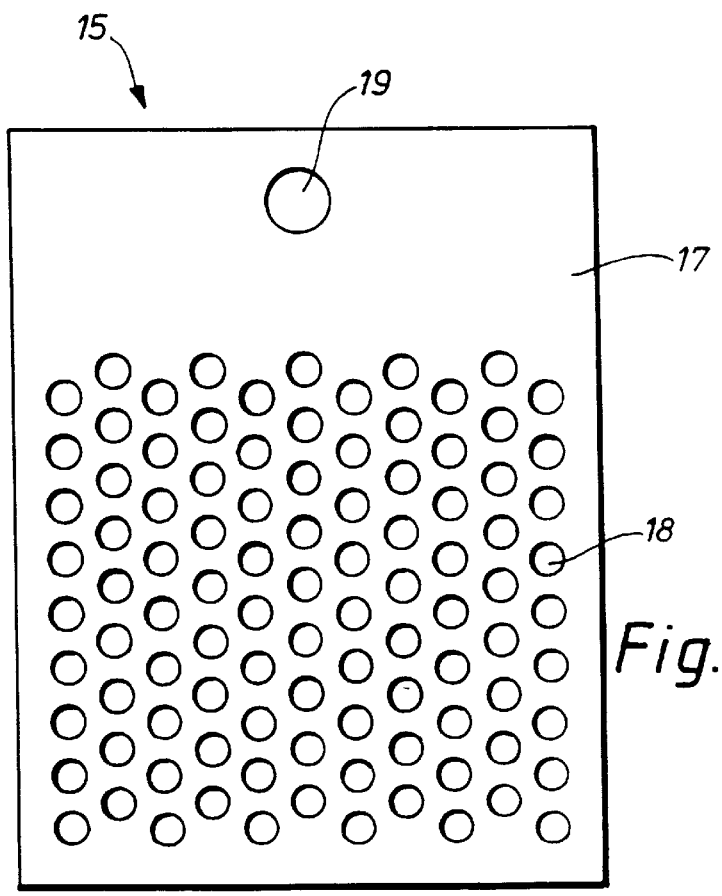
FIG. 2 is a view of the coarse filter of FIG. 1.
Figure 3:
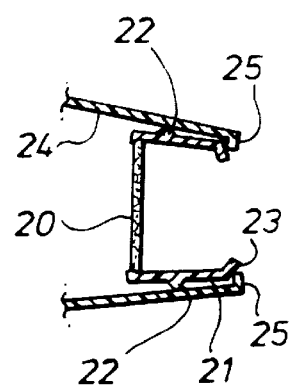
FIG. 3 is an enlarged diagrammatic sectional view of one form of a fine filter attachment.

In the embodiment of FIGS. 1 to 3, a kettle 12 has a kettle body 13, a spout 14, and a handle 14A. The kettle is provided with a relatively coarse filter 15 and a relatively fine filter attachment 16 for preventing scale particles from leaving the kettle with water poured through the spout.

The coarse filter 15 comprises a stainless steel plate 17 formed with 2 to 3 mm diameter filter holes 18 and secured via a fixing 19 hole and fastening 19A to the inside surface of the kettle body to cover the entrance to the spout. Fastenings 19A also secure the handle 14A to the kettle body 13. Instead of the round holes 18 the coarse filter may have other apertures, such as slots of about 2 mm width.

The relatively fine filter attachment 16 in one form shown in FIG. 3, comprises a polypropylene mesh filter 20 of 290 microns and 36% open area. The filter 20 is located at the inner end of a flexible cylindrical support 21 having four angularly spaced outward projections 22 and having an inwardly angled conical forwardly projecting front portion 23. A conical plastics material mounting 24 is designed to be a sealing push fit over the spout exit end and at is front end has an inwardly turned lip 25 in which the cylinder 21 with projections 22 is a sealing snap-fit.

The mesh filter 20 with its support 21 can be easily detached from the housing 24, washed under the tap and replaced.

Figure 4:
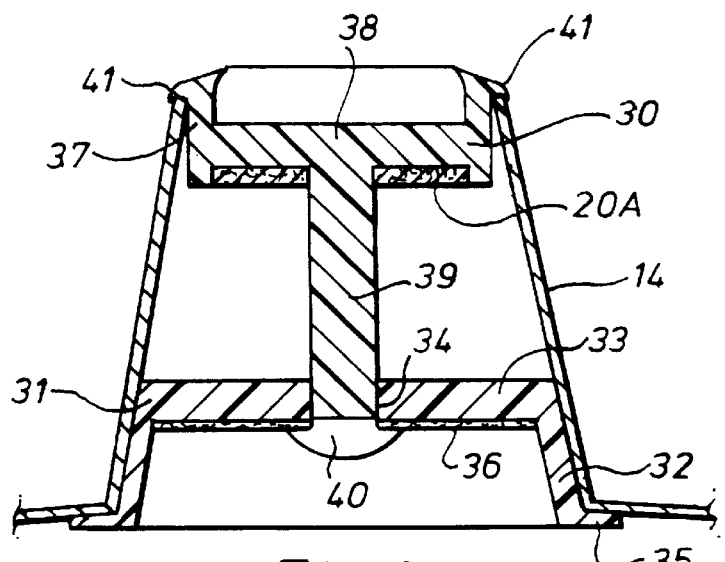
FIG. 4 is a diagrammatic sectional view of a kettle spout with alternative coarse and fine filters.

The embodiment of FIG. 4 shows the kettle spout 14 with a fine filter attachment 30 and a coarse filter attachment 31. Attachment 31 comprises an annular conical plastics body 32 having a central cross member 33 at its inner end defining an aperture 34 with opposite wider portions 34A, and having an annular outwardly turned lip 35 at its outer end. The inner end of the body 32 mounts a plastics material coarse mesh disc 36. The mesh provides a coarse filter comparable to the holes 18. Attachment 30 comprises a cylindrical plastics material support body 37 having a central cross member 38 connected to or integral with an axially extending post 39 carrying a fastener 40. The outer end of the body 37 has an outwardly turned lip 41 and the inner end supports a fine mesh filter 20A similar to filter 20. The attachments 30 and 31 are pushed into opposite ends of a kettle spout and are sized such that when the fastener 40 is pushed through the widened portions 34a of the aperture 34 and turned, the attachments are under pressure so as to hold the lips 35 and 41 in sealing contact with opposite ends of the kettle spout or surround wall of the kettle body. Water poured through the spout must then pass through the filters. By releasing the fastener 40 both attachments can be removed from the kettle, so that the filters can be washed or replaced. The post and fastener can, of course, take other forms such as a screw and nut.

Figure 5:
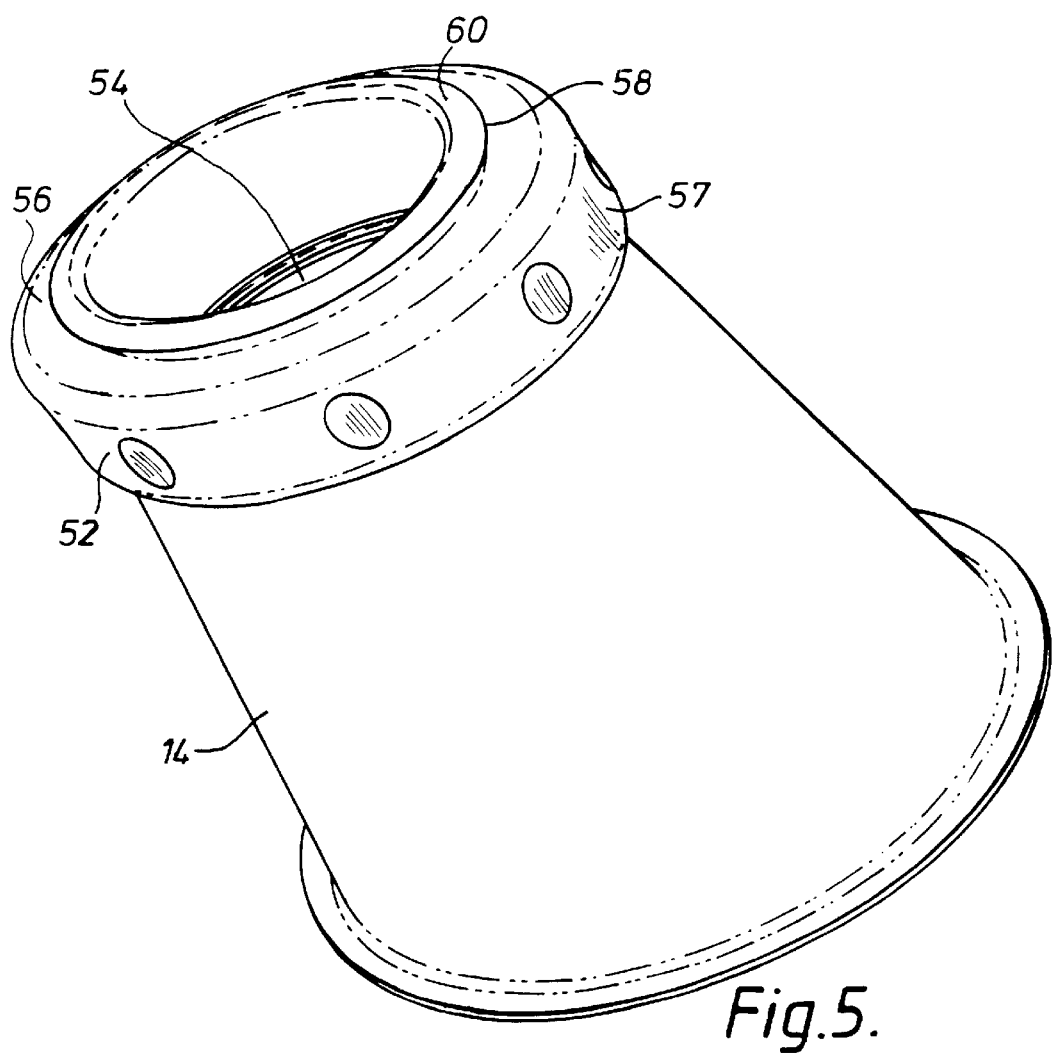
FIG. 5 is a perspective view of another form of fine filter assembly on a spout.
Figure 6:
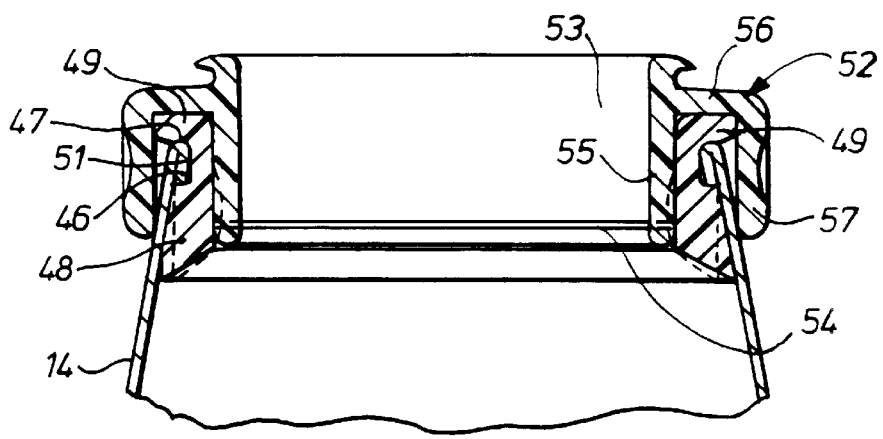
FIG. 6 is an axial section of the assembly of FIG. 4 at the exit end of a kettle spout.
Figure 7:
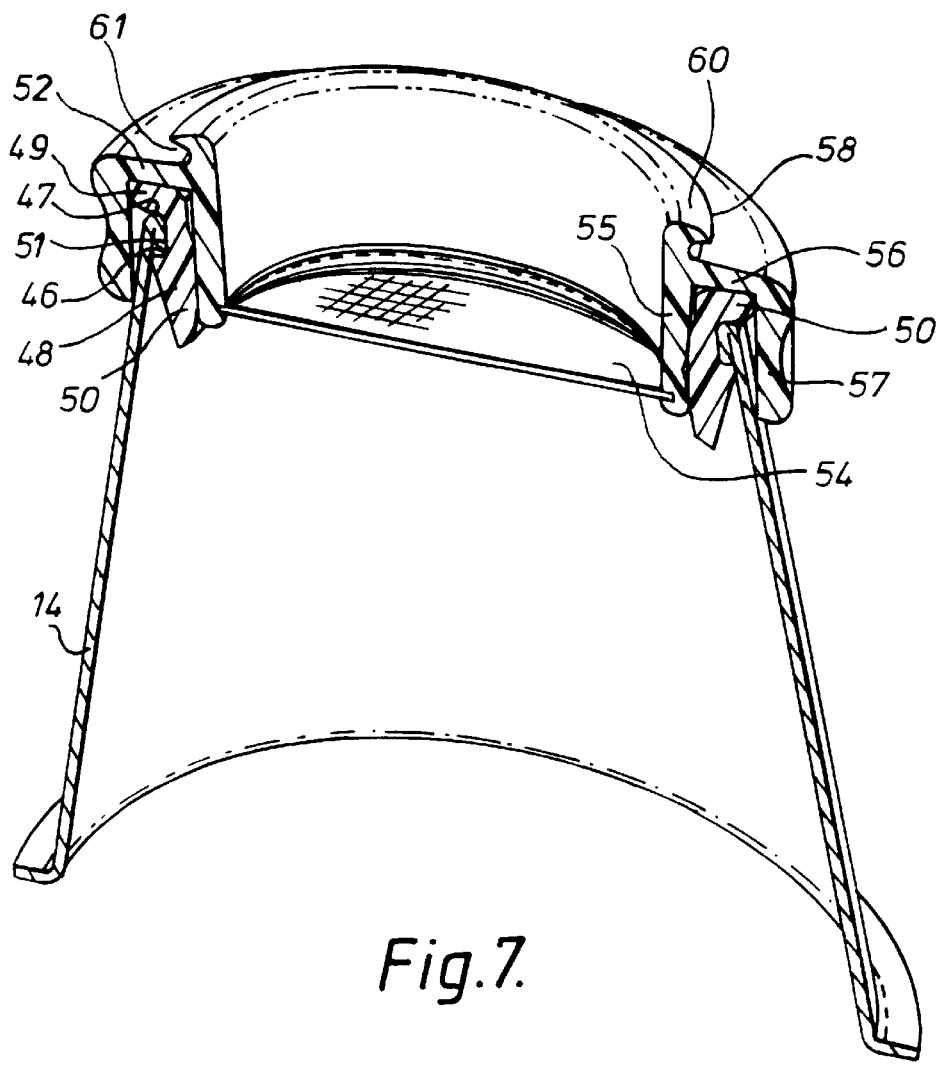
FIG. 7 is a perspective view of the assembly of FIG. 4 located on the kettle spout, both being partially cut away.

The fine filter assembly of FIGS. 5 to 7 may be used on a kettle with a coarse filter or on any other kettle. As seen in FIGS. 6 and 7 preferably the kettle spout 14 tapers inwardly towards its exit end and has an inwardly turned lip 46 so that the outer end face 47 is rounded.

The filter assembly comprises a sealing element 48 of soft elastically deformable material such as flexible silicone. The sealing element is annular and has a first portion 50 which fits inside the spout end with its outer face abutting the inner surface of the spout and the lip 46 accommodated in an annular outwardly facing groove 51. The sealing element has a second portion 49 extending outwardly from the upper end of the first portion which abuts against the outer (upper) surface 47 of the spout. The lip 46 fitting within the recess 51 retains the sealing element on the spout although it is easily removed and reinserted.

A channel sectioned annular element 52 of substantially rigid material, eg polypropylene, defines a passage 53 through which water flows from the kettle through the spout and outwards of the kettle and mounts a filter screen 54 across this passage. The filter screen may for example be a Caddish number 40 stainless plain weave mesh of 460 micron 0.18 wire or plastics. The channel of element 52 is defined by an inner arm 55, a base 56 and an outer arm 57. The channel is sized such that when the sealing element is located on the spout and the filter element 52 is pushed over the end of the spout and the sealing element 48, the sealing element is compressed and deformed so as to form a seal both with the spout inner and end surfaces and with the engaging surface of the inner arm 55. This provides sufficient frictional force to retain the filter element 52 on the spout during normal use and pouring but allows it to be easily pulled off for cleaning of the filter. For this purpose at least a portion of the outer surface of the arm 55 has a diameter greater than the diameter of the inner surface of the portion 48 of the sealing element. In its attached position the base 56 of the portion defining the channel abuts against the outer face of the portion 50 of the sealing element.

The inner arm 55 is extended outwardly beyond the base 56 and has its upper outer edge curved and sloped downwardly to provide an edge 58 to a pouring lip 60, the lip being undercut at 61 to provide the pointed edge 58. This arrangement resists drips forming at the pour edge at any angle the pour stops when emptying the kettle.

What is claimed is:

1. A kettle, comprising a spout having an entrance end and an exit end, a relatively coarse filter located at the entrance end of the spout, and a separate relatively fine filter located at the exit end of the spout for preventing relatively fine particles from leaving the spout in which the fine filter is part of a fine filter assembly including an elastic sealing member and a support for the fine filter having an inwardly and forwardly tapered front end, the assembly being a push fit on the exit end of the spout so that a majority of the sealing member is located in the spout and is compressed to form a seal against an inner surface of the spout to prevent water leaking between the filter assembly and the inner surface of the spout and to retain the assembly on the spout in normal use.

2. A kettle according to claim 1 in which the coarse filter is a metal sheet in the kettle body extending across the entrance to the spout and including apertures for permitting flow of liquid therethrough.

3. A kettle according to claim 2 in which the apertures have an area substantially in the range between 0.2 to 7 sq. mm.

4. A kettle according to claim 1 in which the fine filter is detachably supported in a plastic mounting which is a push-fit on the exit end of the spout.

5. A kettle according to claim 4 in which the fine filter is a snap-fit in the mounting.

6. A kettle according to claim 1 in which the fine filter is a mesh substantially in the range between 200 to 350 microns.

7. A kettle according to claim 6 in which the mesh comprises 30 to 45% open area.

8. A kettle according to claim 1 in which the coarse filter is a mesh substantially in the range between 300 to 500 microns.

9. A kettle, comprising a spout having an entrance end and an exit end, and a separate relatively fine filter located at the exit end of the spout for preventing relatively fine particles from leaving the spout in which the fine filter is part of a fine filter assembly including an elastic sealing member and a support for the fine filter having an inwardly and forwardly tapered front end, the assembly being a push-fit on the exit end of the spout so that a majority of the sealing member is located in the spout and is compressed to form a seal against an inner surface of the spout to prevent water leaking between the filter assembly and the inner surface of the spout and to retain the assembly on the spout in normal use.

10. A kettle according to claim 9 in which the fine filter is detachably supported in a plastic mounting which is a push-fit on the exit end of the spout.

11. A kettle according to claim 10 in which the fine filter is a snap-fit in the mounting.

12. A kettle according to claim 9 in which the fine filter is a mesh substantially in the range between 200 and 350 microns.

13. A kettle, comprising a spout having an entrance end and exit end, a relatively coarse filter located at the entrance end of the spout, and a separate relatively fine filter located at the exit end of the spout for preventing relatively fine particles from leaving the spout in which the fine filter is part of a fine filter assembly including an elastic sealing member and a support for the fine filter having an outwardly turned tapered front end, the assembly being a push-fit on the exit end of the spout so that a majority of the sealing member is located in the spout and is compressed to form a seal against an inner surface of the spout to prevent water leaking between the filter assembly and the inner surface of the spout and to retain the assembly on the spout in normal use.

14. A kettle according to claim 13 in which the coarse filter is a metal sheet in the kettle body extending across the entrance to the spout and including apertures for permitting flow of liquid therethrough.

15. A kettle according to claim 14 in which the apertures have an area substantially in the range 0.2 to 7 sq. mm.

16. A kettle according to claim 13 in which the fine filter is detachably supported in a plastic mounting which is a push-fit on the exit end of the spout.

17. A kettle according to claim 16 in which the fine filter is a snap-fit in the mounting.

18. A kettle according to claim 13 in which the fine filter is a mesh substantially in the range 200 to 350 microns.

19. A kettle according to claim 18 in which the mesh comprises 30 to 45% open area.

20. A kettle according to claim 13 in which the coarse filter is a mesh substantially in the range between 300 to 500 microns.

21. A kettle, comprising a spout having an entrance end and an exit end, and a separate relatively fine filter located at the exit end of the spout for preventing relatively fine particles from leaving the spout in which the fine filter is part of a fine filter assembly including an elastic sealing member and a support for the fine filter having an outwardly turned tapered front end, the assembly being a push-fit on the exit end of the spout so that a majority of the sealing member is located in the spout and is compressed to form a seal against an inner surface of the spout to prevent water leaking between the filter assembly and the inner surface of the spout and to retain the assembly on the spout in normal use.

22. A kettle according to claim 21 in which the fine filter is detachably supported in a plastic mounting which is a push-fit on the exit end of the spout.

23. A kettle according to claim 22 in which the fine filter is a snap-fit in the mounting.

24. A kettle according to claim 21 in which the fine filter is a mesh substantially in the range between 200 and 350 microns.

\* \* \* \* \*